United States Patent
Yu et al.

(10) Patent No.: US 10,767,082 B2
(45) Date of Patent: Sep. 8, 2020

(54) POLYMER COMPOSITIONS FOR UV CURABLE PRIMERS

(71) Applicant: Dow Global Technologies LLC, Midland, MI (US)

(72) Inventors: Haiyang Yu, Shanghai (CN); Qichun Wan, Midland, MI (US); Yongchun Chen, Shanghai (CN); Shaoguang Feng, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/337,983

(22) PCT Filed: Sep. 29, 2016

(86) PCT No.: PCT/CN2016/100771
§ 371 (c)(1),
(2) Date: Mar. 29, 2019

(87) PCT Pub. No.: WO2018/058424
PCT Pub. Date: Apr. 5, 2018

(65) Prior Publication Data
US 2020/0024486 A1   Jan. 23, 2020

(51) Int. Cl.
| C08F 2/46 | (2006.01) |
| C08F 2/50 | (2006.01) |
| C08G 61/04 | (2006.01) |
| C09J 4/06 | (2006.01) |
| C09J 127/06 | (2006.01) |
| C09J 133/16 | (2006.01) |
| C09J 151/06 | (2006.01) |
| B32B 5/02 | (2006.01) |
| B32B 5/18 | (2006.01) |
| B32B 5/24 | (2006.01) |
| B32B 7/12 | (2006.01) |

(52) U.S. Cl.
CPC ............. *C09J 4/06* (2013.01); *C09J 127/06* (2013.01); *C09J 133/16* (2013.01); *C09J 151/06* (2013.01); *B32B 5/02* (2013.01); *B32B 5/18* (2013.01); *B32B 5/245* (2013.01); *B32B 7/12* (2013.01); *B32B 2262/062* (2013.01); *B32B 2266/025* (2013.01); *C09J 2205/31* (2013.01)

(58) Field of Classification Search
CPC ............. C08F 2/50; C08F 2/46; C08G 61/04
USPC ................... 522/182, 178, 1; 520/1
See application file for complete search history.

(56) References Cited

U.S. PATENT DOCUMENTS

| 658,282 A | 9/1900 | Sailer |
| 4,767,823 A | 8/1988 | Jones et al. |
| 4,789,699 A | 12/1988 | Kieffer et al. |
| 4,945,003 A * | 7/1990 | Poole ............... C08J 7/047 |
| | | 428/461 |
| 5,093,422 A | 3/1992 | Himes |
| 5,332,613 A | 7/1994 | Taylor et al. |
| 5,446,064 A | 8/1995 | Hori et al. |
| 6,225,369 B1 | 5/2001 | Jeon |
| 6,653,394 B1 | 11/2003 | Meisenburg et al. |
| 7,388,039 B2 | 6/2008 | Williams et al. |
| 7,763,692 B2 * | 7/2010 | Tamai ............... C08F 290/06 |
| | | 523/160 |
| 7,858,706 B2 | 12/2010 | Arriola et al. |
| 8,450,430 B2 | 5/2013 | Silvis et al. |
| 2004/0122408 A1 | 6/2004 | Potnis et al. |
| 2004/0122409 A1 | 6/2004 | Thomas et al. |
| 2006/0051605 A1 | 3/2006 | Wang et al. |
| 2007/0077418 A1 | 4/2007 | Sakurai et al. |
| 2009/0018231 A1 | 1/2009 | Fink et al. |
| 2010/0009151 A1 | 1/2010 | Yun et al. |
| 2012/0058329 A1 | 3/2012 | Sakurai et al. |

FOREIGN PATENT DOCUMENTS

| EP | 0712892 | 5/1996 |
| WO | 2004041538 | 5/2004 |
| WO | 2008/002952 A2 | 1/2008 |
| WO | 2010016075 A1 | 2/2010 |
| WO | 2016004898 A1 | 1/2016 |
| WO | 2017/156674 A1 | 9/2017 |

OTHER PUBLICATIONS

PCT/CN2016/100771, International Search Report and Written Opinion dated Jun. 30, 2017.
PCT/CN2016/100771, International Preliminary Report on Patentability dated Apr. 2, 2019.

* cited by examiner

*Primary Examiner* — Jessica Whiteley

(57) ABSTRACT

Polymer compositions for UV curable primer formulations, as described herein. The primer formulations contain a modifier selected from the following: at least one modifier selected from a) through d) below: a) R1R2C=CR3-(CO)—Z (Formula A), as described herein, b) an acrylate-containing oligomer that has a Mn≤1500 g/mol, and an acid value from 50 to 500 mg KOH/g; c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof or d) any combination of a) through c). Such primer formulations are useful for the binding of olefin-based polymer foams.

10 Claims, 1 Drawing Sheet

POLYMER COMPOSITIONS FOR UV CURABLE PRIMERS

BACKGROUND

The non-polar molecular nature of the olefin-based polymers (for example, olefin multi-block copolymers) makes them difficult to be bonded, painted, and printed due to the low surface energy of these polymers. For example, in the footwear assembling process, the midsole is bonded to the vulcanized rubber outsole, and to the shoe upper which is made from natural/artificial leather. Typically, the existing maximum total olefin-based polymer loading in the midsole formulation cannot exceed 30 wt % (the balance is EVA), due to adhesion issues of higher olefin content of the olefin-based polymer content compositions. Therefore new adhesion formulations are needed, which provide acceptable bonding performance of midsoles containing higher amounts of olefin-based polymer. In previous foam laminates, UV primers were developed to enhance the bonding of "olefin rich" foams to other substrates, using PU adhesives. For example, see WO2016004898, which discloses disclosed a UV primer for OBC rich midsole bonding, by using reactive diluents, maleic anhydrate grafted chlorinated polyolefins, styrene block copolymers, photo initiators and solvents; and International Patent Application No. PCT/CN16/076245 (filed Mar. 14, 2016), which discloses a novel bonding process to further improve the bonding strength of OBC rich midsole foam by increasing the UV energy but still maintain the OBC foam sample non warped (due to the unique block structure of OBC). Other polymer formulations, most or all curable by UV, are described in the following references: U.S. Pat. Nos. 6,225,369, 6,653,394, 7,388,039, US20090018231 and WO2010016075.

However, there is still a requirement for high green peel strength as the bonded shoe product will be subjected to compression and transportation in a short time. A high green peel strength will ensure the bonded sample will not delaminated during these post treating steps, which is very important to ensure the production quality. This need has been met by the following invention.

SUMMARY OF THE INVENTION

A composition comprising at least the following:
A) at least one modifier selected from a) through d) below:
 a) $R^1R^2C=CR^3-(CO)-Z$ (Formula A),
 wherein $R^1$, $R^2$ and $R^3$ are each, independently, selected from the following: H; alkyl; heteroalkyl; aryl; heteroaryl; —C(O)—OH; or —R—C(O)—OH, where R is alkylene;
 Z is selected from the following: —OH; —O—R—OH, where R is alkylene; —NR'R", where R' and R" are each independently H or alkyl; —N(H)—R'''OH, where R''' is alkylene; silane;

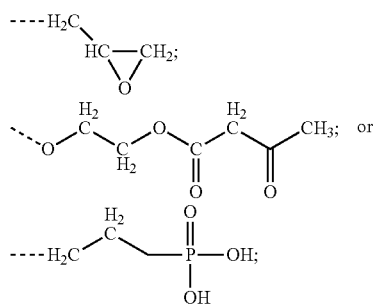

and wherein two or more atoms of Formula A may optionally form a ring structure;
 b) an acrylate-containing oligomer that has an Mn≤1500 g/mol and an acid value from 50 to 500 mg KOH/g;
 c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof;
 d) or any combination of a) through c);
B) at least one chlorinated olefin-based polymer and/or at least one functionalized chlorinated olefin-based polymer;
C) at least one styrene-based block interpolymer or derivative thereof; and
D) at least one compound selected from the group consisting of the following:

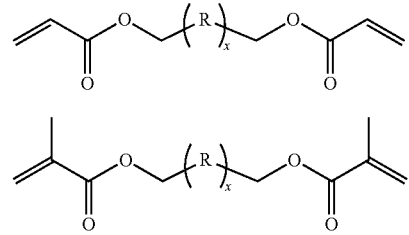

(Formula D1)

and/or

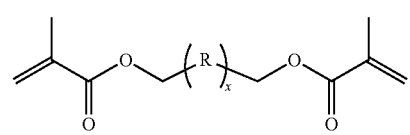

(Formula D2)

wherein, for Formula D1, R is independently selected from the group consisting of the following; substituted or unsubstituted hydrocarbylenes, and substituted or unsubstituted hetero-hydrocarbylenes, and x is an integer ≥1;
wherein, for Formula D2, R is independently selected from the group consisting of the following; substituted or unsubstituted hydrocarbylenes, and substituted or unsubstituted hetero-hydrocarbylenes, and x≥1.

DETAILED DESCRIPTION

Figure 1:
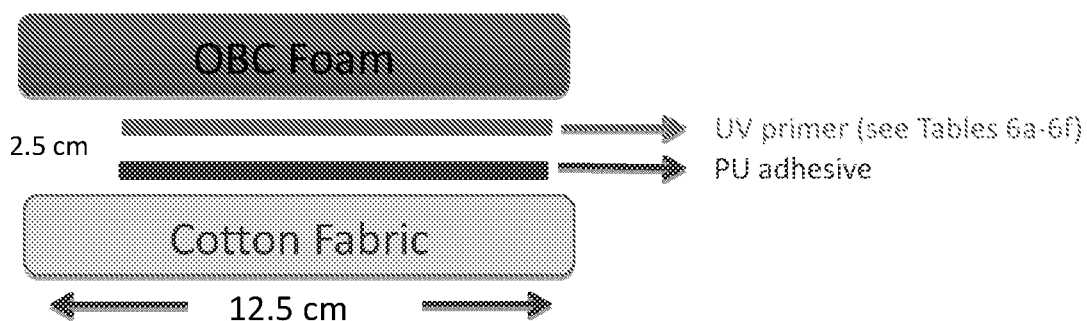
FIG. 1 is a schematic depicting the cross-section of the laminate configuration.

It has been discovered that the low green peel strength (here, peel strength after five minutes) of prior primer formulations is due to the weak interaction between the UV curable primer and the PU adhesive layer. Primer formulations have been discovered with enhanced the interaction towards both the PU adhesive and the olefin-rich foam. It has been discovered that the use of modifiers that contain reactive hydrogen groups (hydroxyl, carboxylic, amine groups, etc.) result in primers have high green peel strength. These modifiers can be copolymerized with the reactive diluents upon UV radiation.

As discussed above, a composition is provided that comprises at least the following:
A) at least one modifier selected from a) through d) below:
 a) $R^1R^2C=CR^3-(CO)-Z$ (Formula A),
 wherein $R^1$, $R^2$ and $R^3$ are each, independently, selected from the following: H; alkyl; heteroalkyl; aryl; heteroaryl; —C(O)—OH; or —R—C(O)—OH, where R is alkylene;

Z is selected from the following: —OH; —O—R—OH, where R is alkylene; —NR'R", where R' and R" are each independently H or alkyl; —N(H)—R'''OH, where R''' is alkylene; silane;

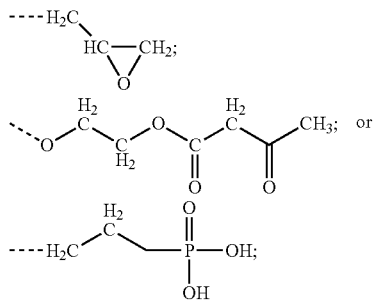

and wherein two or more atoms of Formula A may optionally form a ring structure;
b) an acrylate-containing oligomer that has an Mn≤1500 g/mol, or ≤1200 g/mol, or ≤1000 g/mol, or ≤800 g/mole, or ≤600 g/mol, or ≤500 g/mol, or ≤400 g/mol, or ≤300 g/mol, and an acid value from 50 to 500 mg KOH/g;
c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof;
d) or any combination of a) through c);
B) at least one chlorinated olefin-based polymer and/or at least one functionalized chlorinated olefin-based polymer;
C) at least one styrene-based block copolymer or derivative thereof; and
D) at least one compound selected from the group consisting of the following:

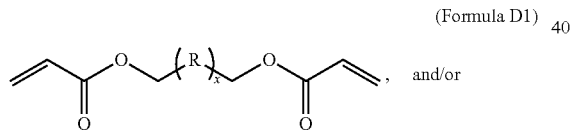

(Formula D1)

and/or

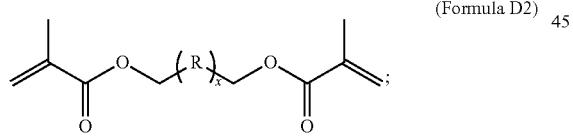

(Formula D2)

wherein, for Formula D1, R is independently selected from the group consisting of the following; substituted or unsubstituted hydrocarbylenes, and substituted or unsubstituted hetero-hydrocarbylenes, and x is an integer ≥1;
wherein, for Formula D2, R is independently selected from the group consisting of the following; substituted or unsubstituted hydrocarbylenes, and substituted or unsubstituted hetero-hydrocarbylenes, and x≥1.

An inventive composition may comprise one or more embodiments as described herein.

In one embodiment, the composition further comprises at least one photoinitiator.

In one embodiment, the weight ratio of component A to the sum weight of components B, C and D, A/(B+C+D), is from 0.10 to 0.75, further from 0.10 to 0.65, further from 0.10 to 0.60.

In one embodiment, component A is present in an amount from 5 to 50 wt %, or from 5 to 45 wt %, or from 5 to 40 wt %, or from 5 to 35 wt %, based on the weight of the total solid content of the composition.

In one embodiment, the an acrylate-containing oligomer (component A) b) that has a viscosity at 25° C. from 1,000 mPa·s to 100 000 mPa·s, or from 1,500 mPa·s to 100,000 mPa·s, or from 2,000 to 100,000 mPa·s.

In one embodiment, component A is a random terpolymer that comprises the following properties: i) a Mw from 10,000 to 100,000 g/mole; ii) from 70 to 95 wt % vinyl chloride, based on the weight of the terpolymer, iii) from 5 to 15 wt % vinyl acetate, based on the weight of the terpolymer; and iv) from greater than zero to 15 wt %, based on the weight of the terpolymer, of a hydroxyl-containing alkyl acrylate, where alkyl group comprises 1 to 6 carbons, or a hydroxyl-containing alkyl methacrylate where the alkyl group comprises 1 to 6 carbons.

In one embodiment, component D is selected from the following: (a) through (l):

(a)

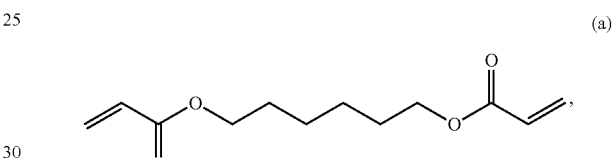

(b)

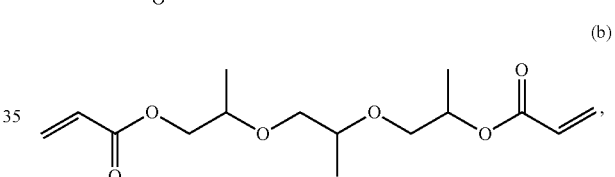

(c)

(d)

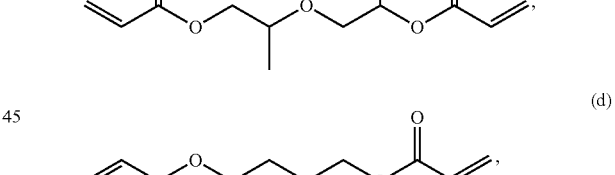

(e)

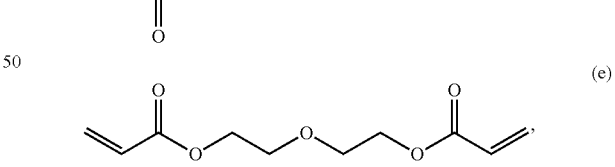

(f)

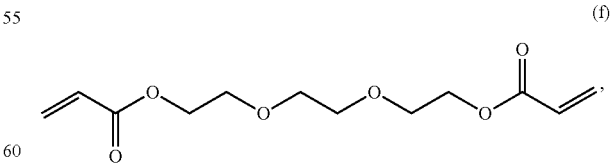

(g)

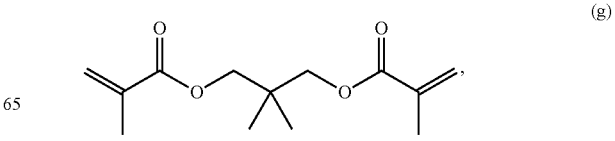

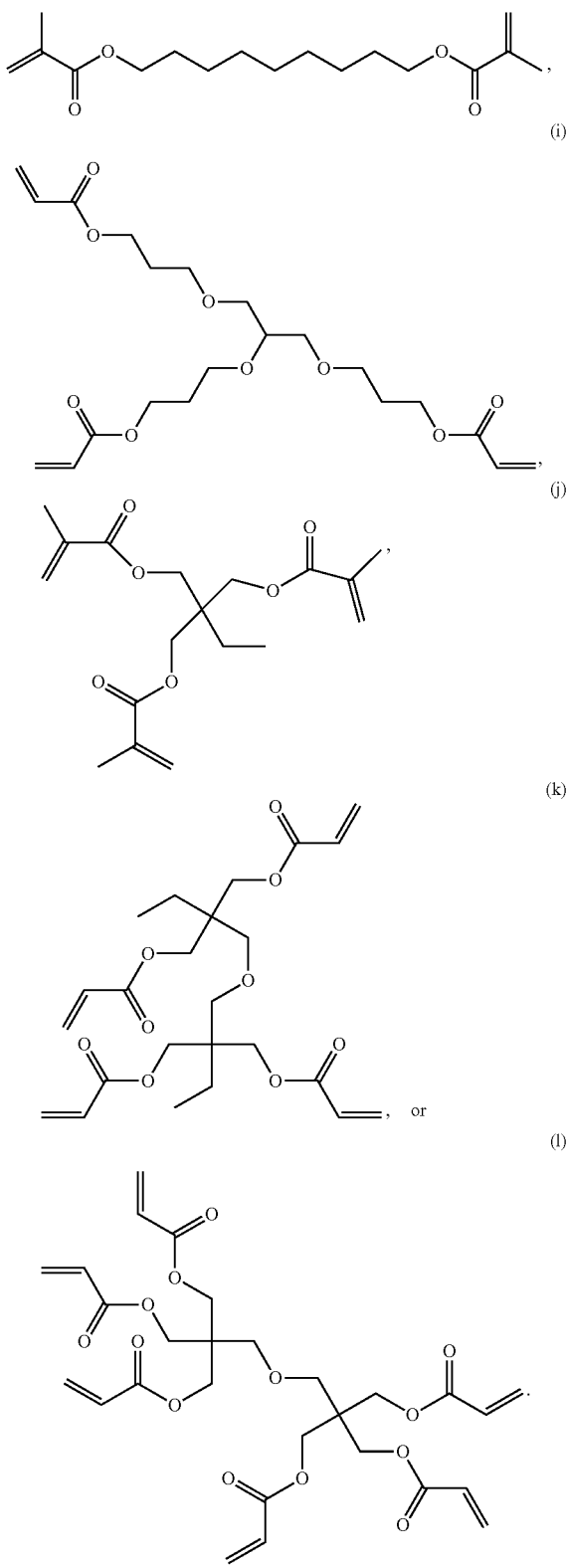

In one embodiment, component D) is selected from the group consisting of the following: 1,6 hexanediol diacrylate (HDDA), tri propylene glycol di-acrylate (TPGDA); dipropylene glycol diacrylate (DPGDA); 1,4-butanediol diacrylate (BDDA); diethylene glycol diacrylate; triethylene glycol diacrylate; neopentyl glycol diacrylate (NPGDA); and nonanediol Diacrylate (NDDA).

In one embodiment, component B, is selected from the group consisting of chlorinated olefin-based polymers that have a chlorine content from 10 to 40 wt %, based on the weight of the chlorinated olefin-based polymer.

In one embodiment, component C is selected from the group consisting of the following: styrene-ethylene/butylene-styrene block copolymer (SEBS); styrene/butadiene-/styrene block copolymer (SBS); and maleic anhydride grafted styrene-ethylene/butylene-styrene block copolymer (SEBS-g-MAH).

In one embodiment, the composition further comprises one or more non-aromatic and nonchlorinated organic solvents.

In one embodiment, the composition comprises from 0.1 to 10 wt % combined amount of components A), B), C) and D) and from 99.9 to 90 wt % of the one or more non-aromatic and nonchlorinated organic solvents; each wt % based on the weight of the composition.

In one embodiment, the composition comprises from 0.1 to 10 wt % combined amount of components A), B), C), D) and the photoinitiator, and from 99.9 to 90 wt % of the one or more non-aromatic and nonchlorinated organic solvents; each wt % based on the weight of the composition.

In one embodiment, the composition is a primer composition.

Also is providing an article comprising at least one component formed from the composition of any one or more embodiments herein.

In one embodiment, the article further comprises a substrate. In a further embodiment, the substrate is formed from a composition comprising an olefin multi-block copolymer, and, optionally, at least one other polymer. In a further embodiment, the substrate is formed from a composition comprising an olefin multi-block copolymer (for example, see U.S. Pat. No. 7,858,706) and, optionally, at least one other polymer. The other polymer differs in one or more properties from the olefin block copolymer, for examples, in density, melt index, Mw, Mn, MWD, comonomer, and/or the amount of comonomer. In one embodiment, the other polymer is an EVA. In an embodiment, the olefin multi-block copolymer is an ethylene multi-block copolymer (for example, an ethylene/octene multi-block copolymer). Ethylene multi-block copolymers are sold under the Trade name INFUSE™ Olefin Block Copolymers, available from The Dow Chemical Company, Midland, Mich., USA.

In one embodiment, the article is selected from the group consisting of footwear products. In one embodiment, the at least one component is an adhesive primer for a midsole. In a further embodiment, the article is a footwear product.

In one embodiment, the invention provides the composition and article of manufacture in accordance with any of the embodiments disclosed herein except that the article of manufacture is selected from the group consisting of footwear. Exemplary footwear includes sports shoes, water shoes, boots, safety footwear, and sandals.

In one embodiment, the invention provides the composition and article of manufacture in accordance with any of the embodiments disclosed herein except that the component of the article of manufacture which comprises the composition is an adhesive primer for a midsole.

The invention provides an article of manufacture comprising at least one component formed from an inventive composition. In one embodiment, the article is a footwear product. In one embodiment, the at least one component is an adhesive primer for a midsole.

Component A (Modifier)

In one embodiment, component A is further selected from the following: a) $R^1R^2C=CR^3-(CO)-Z$ (Formula A), wherein $R^1$, $R^2$ and $R^3$ are each, independently, selected from the following: H; alkyl; heteroalkyl; aryl; heteroaryl; —C(O)—OH; or —R—C(O)—OH, where R is alkyl; Z is selected from the following: —OH; —OROH, where R is alkyl; or

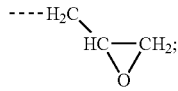

b) an acrylate-containing oligomer acrylate-containing oligomer that has an Mn≤1500 g/mol, or ≤1200 g/mol, or ≤1000 g/mol, or ≤800 g/mole, or ≤600 g/mol, or ≤500 g/mol, or ≤400 g/mol, or ≤300 g/mol, and an acid value from 50 to 500 mg KOH/g, and further a polyester acrylate containing oligomer, and further a polyester acrylate containing oligomer that has a viscosity at 25° C. from 2,000 mPa·s to 100,000 mPa·s, or from 5,000 to 100,000 mPa·s, or from 10,000 to 100,000 mPa·s, or from 20,000 to 100,000 mPa·s, or from 50,000 to 100,000 mPa·s;

c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof; or any combination of a) through c).

In one embodiment, component A is selected from the following: a) $R^1R^2C=CR^3-(CO)-Z$ (Formula A), wherein $R^1$, $R^2$ and $R^3$ are each, independently, selected from the following: H; alkyl; heteroalkyl; aryl; heteroaryl; —C(O)—OH; or —R—C(O)—OH, where R is alkyl; Z is selected from the following: —OH; —OROH, where R is alkyl; —NR'R", where R' and R" are each independently H or alkyl; —NHR'''OH, where R''' is alkyl; silane;

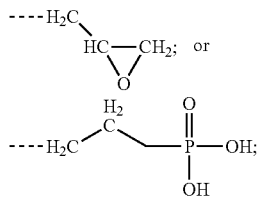

and wherein two or more atoms of Formula A may optionally form a ring structure. In a further embodiment, component A is selected from the following: a) $R^1R^2C=CR^3-(CO)-Z$ (Formula A), wherein $R^1$, $R^2$ and $R^3$ are each, independently, selected from the following: H; alkyl; heteroalkyl; aryl; heteroaryl; —C(O)—OH; or —R—C(O)—OH, where R is alkyl; Z is selected from the following: —OH; —OROH, where R is alkyl; or

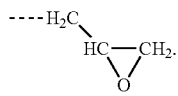

In one embodiment, A is selected from b) an acrylate-containing oligomer that has a viscosity at 25° C. from 1,000 mPa·s to 100,000 mPa·s, and an acid value from 50 to 500 mg KOH/g, and further an acrylate-containing oligomer, and further a polyester acrylate containing oligomer, that has a viscosity at 25° C. from 10,000 mPa·s to 100,000 mPa·s, or from 20,000 to 100,000 mPa·s, or from 30,000 to 100,000 mPa·s, or from 40,000 to 100,000 mPa·s, or from 50,000 to 100,000 mPa·s, and an acid value from 50 to 400 mg KOH/g.

In one embodiment, component A is selected from the following: c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof. In one embodiment, the terpolymer has a weight average molecular weight, Mw, from 60,000 to 110,000 g/mole.

Component D

In one embodiment, component D is selected from the following i) through v):

i) $Z^1-(CR^1R^2-O-C(O)-CR^3=CH_2)_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl;

ii) $Z^2_{(4-x)}-C-[CR^4R^5-(R^6)_y-O-C(O)-CR^7=CH_2]_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; y≥0; and when y=0, $R^6$ is not present; $R^7$ is selected from hydrogen or an alkyl; and x is from 1 to 4; and when x=4, $Z^2$ is not present;

iii) $Z^3_{(3-x)}-CR^8-[CR^9R^{10}-(R^{11})_y-O-C(O)-CR^{12}=CH_2]_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O-C(O)-CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; $R^{11}$ is selected from an unsubstituted hydrocarbylene, a substituted hydrocarbylene, an unsubstituted hetero-hydrocarbylene, or a substituted hetero-hydrocarbylene; y≥0; and when y=0, $R^1$ is not present; $R^{12}$ is selected from hydrogen or an alkyl; and x is from 1 to 3; and when x=3, $Z^3$ is not present;

iv) $O-\{CR^{13}R^{14}-C(Z^4_{(3-x)})-[CR^{15}R^{16}-(R^{17})_y-O-C(O)-CR^{18}=CH_2]_x\}_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R^{14}$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; y≥0, and when y=0, $R^{17}$ is not present; $R^{18}$ is selected from hydrogen or an alkyl; and x is from 1 to 3; and when x=3, $Z^4$ is not present;

v) a combination of two or more from Formulas 1 through 4 above.

In one embodiment, for Formula 1, $Z^1$ is selected from the following: —CHR—O—CHR—, wherein each R is independently H or alkyl; —CHR—O—CHRCHR—O—CHR—, wherein each R is independently H or alkyl; or —(CHR)n-, wherein R is H or alkyl, and n≥1;

for Formula 2, $Z^2$ is selected from an unsubstituted hydrocarbyl; $R^6$ is selected from an unsubstituted hydrocarbylene, or an unsubstituted hetero-hydrocarbylene;

Formula 3, $Z^3$ is selected from hydrogen or an unsubstituted hydrocarbyl; $R^{11}$ is selected from an unsubstituted hydrocarbylene, or an unsubstituted hetero-hydrocarbylene for Formula 4, $Z^4$ is selected from an unsubstituted hydrocarbyl; $R^{17}$ is selected from an unsubstituted hydrocarbylene, or an unsubstituted hetero-hydrocarbylene.

In one embodiment, Component A or Component D is selected from the following: (a) through (l), each as shown above.

In one embodiment, the at least one compound of component D is selected from the group consisting of the following: 1,6 Hexanediol diacrylate (HDDA), tri propylene glycol di-acrylate (TPGDA); dipropylene glycol diacrylate (DPGDA) and 1,4-butandiol diacrylate (BDDA). In one embodiment, the at least one compound of component D) is selected from the group consisting of the following: Diethylene glycol diacrylate; Triethylene glycol diacrylate; Neopentyl glycol diacrylate (NPGDA); and Nonanediol Diacrylate (NDDA). In one embodiment, the at least one compound of component D) is selected from the group consisting of the following: Glycerylpropoxy Triacrylate (GPTA); Trimethylol-propane Trimethacrylate (TMPTMA); Di-Trimethylolpropane Tetraacrylate (Di-TMPTA); and Di-pentaerythritol hexa acrylate (DPHA). Examples of component D include 1,6-hexanediol dimethacrylate (HDDA) (having the structure shown in Formula 1) and tripropylene glycol diacrylate (TPGDA) (having the structure shown in Formula 2). In one embodiment, the component is HDDA. In one embodiment, the component D is selected from the following:

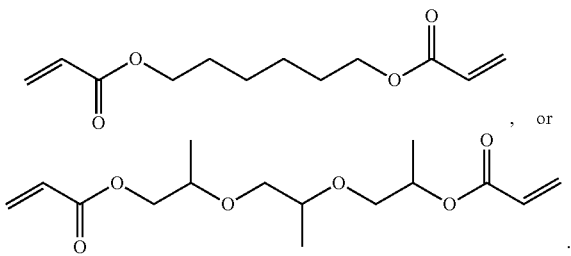

In one embodiment, component D) comprises 1,6-hexanediol dimethacrylate (HDDA). In on embodiment, component D) comprises tripropylene glycol diacrylate (TPGDA).

Component C

Component C is a styrene-based block interpolymer or a derivatives thereof. In one embodiment, Component C has a styrene level, from 10 to 50 wt %, or from 15 to 45 wt %, or from 20 to 40 wt %, or from 25 to 35 wt %, based on the weight of the interpolymer. See, for example, KRATON G1652 (30 wt % styrene) or KRATON FG 1901 (MAH-g-SEBS with 30 wt % styrene and 1.7 wt % functionality).

Examples of styrenic block interpolymers suitable for the invention are described in EP 0 712 892 B1, WO 2004/041538 A1, U.S. Pat. No. 6,582,829B1, US2004/0087235 A1, US2004/0122408 A1, US2004/0122409A1, and U.S. Pat. Nos. 4,789,699, 5,093,422 and 5,332,613, the disclosures of which are incorporated herein by reference. Some styrene-based block copolymers or derivatives thereof are described below.

In general, hydrogenated styrenic block interpolymers suitable for the invention have at least two mono-alkenyl arene blocks, preferably two polystyrene blocks, separated by a block of saturated conjugated diene comprising less than 20% residual ethylenic unsaturation, preferably a saturated polybutadiene block. The preferred styrenic block copolymers have a linear structure although in some embodiments, branched or radial polymers or functionalized block copolymers make useful compounds (amine-functionalized styrenic block copolymers are generally disfavored in the manufacture of the artificial leather of this invention).

Typically, polystyrene-saturated polybutadiene-polystyrene and polystyrene-saturated polyisoprene-polystyrene block copolymers comprise polystyrene end-blocks having a number average molecular weight from 5,000 to 35,000 g/mole, and saturated polybutadiene or saturated polyisoprene mid-blocks having a number average molecular weight from 20,000 to 170,000 g/mole. The saturated polybutadiene blocks preferably have from 35-55% 1,2-configuration and the saturated polyisoprene blocks preferably have greater than 85% 1,4-configuration.

The total number average molecular weight of the styrenic block copolymer is preferably from 30,000 to 250,000 g/mole, further from 35,000 g/mole to 100,000 g/mole, if the interpolymer has a linear structure. Such block interpolymers typically have an average polystyrene content from 10 wt % to 30 wt %, more typically from 10 wt % to 20 wt %, based on the weight of the interpolymer.

SEBS (S is styrene, E is ethylene and B is butylene) and SEPS (P is propylene) block copolymers useful in certain embodiments of the present invention are available from each of Kraton Polymers, Asahi Kasei and Kuraray America.

In one embodiment, the at least one styrene-based block interpolymer or derivative thereof, component C) is selected from the group consisting of the following: styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

In one embodiment, the one styrene-based block interpolymer, or derivative thereof, has a Mn from 30,000 to 150,000 g/mole, or from 35,000 to 100,000 g/mole, or from 50,000 to 60,000 g/mole. In one embodiment, the one styrene-based block interpolymer, or derivative thereof, has a Mw from 40,000 to 200,000 g/mole, or from 50,000 to 125,000 hg/mole, further from 55,000 to 65,000 g/mole. In one embodiment, the one styrene-based block interpolymer, or derivative thereof, has a MWD from 1.02 to 2.5, or from 1.04 to 1.50, or from 1.06 to 1.20. Other examples of Component C are listed in Table A below.

TABLE A

| | MAH wt % | Styrene wt % | Melt Flow- g/10 min @ 230 C, 5 kg | Mn (g/mole) | Mw (g/mol) | Mw/Mn |
|---|---|---|---|---|---|---|
| KRATON FG1901 G | 1.00% | 30 | 22 | 35196 | 59129 | 1.68 |
| KRATON G1652 M | 0 | 30 | 5 | 55989 | 59348 | 1.06 |
| KRATON FG1924 G | 1.70% | 13 | 40 | 53777 | 107446 | 2.00 |

Component B

Component B is a chlorinated olefin-based polymer and/or functionalized chlorinated olefin-based polymer.

In one embodiment, component B is a chlorinated olefin-based polymer, for example a chlorinated olefin-based polymer that has a chlorine content of from 15 to 40 wt %, based on the weight of the polymer. All individual values and subranges from 15 to 40 wt % are included and disclosed herein; for example, the chlorine content can range from a lower limit of 10, or 12, or 15, or 16, or 17, or 18 wt % to an upper limit of 20, or 22, or 25, or 30, or 35, or 40 wt %.

In one embodiment, component B is a functionalized chlorinated olefin-based polymer, for example, a functionalized chlorinated olefin-based polymer that has a chlorine content of from 15 to 40 wt %, based on the weight of the polymer. All individual values and subranges from 15 to 40 wt % are included and disclosed herein; for example, the chlorine content can range from a lower limit of 10, or 12, or 15, or 16, or 17, or 18 wt % to an upper limit of 20, or 22, or 25, or 30, or 35, or 40 wt %. In a further embodiment, the functionalized chlorinated olefin-based polymer is a maleic anhydride functionalized chlorinated olefin-based polymer, and further a maleic anhydride grafted chlorinated olefin-based polymer.

In one embodiment, component B is a chlorinated olefin-based polymer that has a chlorine content of from 15 to 40 wt %, based on the weight of the polymer and/or a functionalized chlorinated olefin-based polymer that has a chlorine content of from 15 to 40 wt %, based on the weight of the polymer. All individual values and subranges from 15 to 40 wt % are included and disclosed herein; for example, the chlorine content can range from a lower limit of 10, or 12, or 15, or 16, or 17, or 18 wt % to an upper limit of 20, or 22, or 25, or 30, or 35, or 40 wt %. In a further embodiment, the functionalized chlorinated olefin-based polymer is a maleic anhydride functionalized chlorinated olefin-based polymer, and further a maleic anhydride grafted chlorinated olefin-based polymer.

Preferable examples of olefin-based polymers for use in the production of chlorinated olefin-based polymers include, but are not limited to, polypropylene-based polymers, such as, polypropylene homopolymers, propylene-alpha-olefin interpolymers and propylene-alpha-olefin copolymers; and ethylene-based polymers, such as, polyethylene homopolymers, ethylene-alpha-olefin interpolymers and ethylene-alpha-olefin copolymers.

Examples of alpha-olefins in propylene-alpha-olefin interpolymers and copolymers include ethylene or $C_{4-20}$ alpha-olefins, such as ethylene, 1-butene, 1-pentene, 1-hexene, 1-heptene, 1-octene, 1-decene, 1-dodecene, 1-hexadecene, 4-methyl-1-pentene.

Examples of alpha-olefins in ethylene-alpha-olefin copolymers include $C_{3-20}$ α-olefins, such as propylene, 1-butene, 1-pentene, 1-hexene, 1-heptene, 1-octene, 1-decene, 1-dodecene, 1-hexadecene, 4-methyl-1-pentene.

In one embodiment, component B has a weight average molecular weight, Mw, from 25,000 to 125,000 g/mole. All individual values and subranges from 25,000 to 125,000 g/mole are included and disclosed herein; for example, the Mw can be from a lower limit of 25,000, 30,000, 35000, or 40,000 g/mole to an upper limit of 60,000, 75,000, 100,000, or 125,000 g/mole. For example, the Mw can be from 25,000 to 125,000, or from 25000 to 75000 g/mole, or from 75,000 to 125,000, or from 50,000 to 100,000 g/mole.

Examples of chlorinated ethylene-based polymers include those prepared from copolymers comprising ethylene and at least one ethylenically unsaturated monomer, selected from the group consisting of $C_3$-$C_8$ alpha-olefins.

Specific examples of suitable chlorinated ethylene-based copolymers, which may be employed in the compositions of this invention, include copolymers of ethylene with propylene, 1-butene, 3-methyl-1-pentene, 1-pentene, 1-hexene, 1-heptene or octene.

Examples of chlorinated propylene-based polymers (not functionalized) include HARDLEN DX-526P and HARDLEN 14-LWP which are commercially available from Toyo Kasei Kogyo Company (Japan). Examples of chlorinated propylene-based polymers (functionalized) include HARDLEN F-2P which is commercially available from Toyo Kasei Kogyo Company (Japan) or SUPERCHLORN 930S which is commercially available from Nippon Paper Industries Co., Ltd. Examples of chlorinated ethylene-based polymers include the TYRIN chlorinated polyethylenes, which are commercially available from The Dow Chemical Company.

As used herein, the term "functionalized, chlorinated olefin-based polymer" refers to one or more of the following: (a) a chlorinated olefin-based polymer onto which anhydride (for example, maleic anhydride) and/or carboxylic acid functional groups are grafted onto the olefin based polymer; (b) an olefin-based polymer comprising one or more chlorine containing comonomers, and which is later functionalized with maleic anhydride and/or carboxylic acid functional groups; and (c) chlorinated polymers containing one or more comonomers containing carboxylic acid and/or ester groups. Grafting reactions, are described for example in U.S. Pat. Nos. 8,450,430 and 7,763,692, the disclosures of which are incorporated herein by reference. Alternatively, the functional group may be present in a copolymer (i.e., carboxylic acid functional group) which is copolymerized with the olefin monomers to form the olefin based polymer.

In one embodiment, the functionalized chlorinated olefin-based polymer is an anhydride and/or carboxylic acid functionalized, chlorinated olefin-based polymer, which is formed from a chlorinated olefin-based polymer, onto which, maleic anhydride and/or carboxylic acid functional groups are grafted onto the olefin based polymer. U.S. Pat. No. 7,763,692 discloses exemplary functionalized chlorinated olefin-based polymers.

In one embodiment, the functionalized chlorinated olefin-based polymer is an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer. All individual values and subranges from 10 to 35 wt % chlorine are included and disclosed herein; for example, the chlorine content can be from a lower limit of 10, 11, 12, 16, 18 wt % to an upper limit of 20, 22, 24, 26, 28, 30, 32, 34, or 35 wt %. For example, the chlorine content can be from 10 to 35 wt %, or from 10 to 30 wt %, or from 10 to 25 wt %, or in the alternative, from 18 to 32 wt %, or 15 to 30 wt %. In a particular embodiment, the anhydride and/or carboxylic acid functionalized, chlorinated olefin-based polymer is a maleic anhydride grafted chlorinated polyolefin (MAH-g-CPO). In yet another specific embodiment, the anhydride and/or carboxylic acid functionalized, chlorinated olefin-based polymer is a maleic anhydride grafted chlorinated polyolefin having a maleic anhydride content of from 0.75 to 3 wt %, based on the weight of the anhydride functionalized, chlorinated olefin-based polymer. All individual values and subranges from 0.75 to 3.00 wt % are included and disclosed herein; for example, the maleic anhydride level can be from a lower limit of 0.75, 0.80, 0.85, or 0.90 wt % to an upper limit of 1.00, 1.05, 1.15, 1.20, 1.30, 1.40, 1.50, 1.60, 1.70, 1.80, 1.90, 2.00, 2.10, 2.20, 2.30, 2.40, 2.50, 2.60, 2.70, 2.80, 2.90 or 3.00 wt %.

In one embodiment, the anhydride and/or carboxylic acid functionalized, chlorinated olefin-based polymer is a maleic anhydride grafted chlorinated polyolefin, having a weight average molecular weight, Mw, from 25,000 to 125,000 g/mole. All individual values and subranges from 25,000 to 125,000 g/mole are included and disclosed herein; for example, the Mw can be from a lower limit of 25000, 30,000, 35,000, or 40,000 g/mole to an upper limit of 75,000, 100,000, or 125,000 g/mole. For example, the Mw can be from 25,000 to 125,000 g/mole, or from 35,000 to 100,000 g/mole, or from 35,000 to 125,000 g/mole, or from 40,000 to 100,000 g/mole.

In one embodiment, the at least one chlorinated olefin-based polymer of component B is selected from the group consisting of chlorinated olefin-based polymers that have a chlorine content from 10 to 40 wt %, of from 15 to 35 wt %, based on the weight of the chlorinated olefin-based polymer.

In one embodiment, the at least one chlorinated olefin-based polymer of component B is selected from the group consisting of functionalized chlorinated olefin-based polymers that have a chlorine content from 10 to 40 wt %, or from 15 to 35 wt %, based on the weight of the functionalized chlorinated olefin-based polymer. In a further embodiment, the functionalized chlorinated olefin-based polymer is anhydride and/or carboxylic functionalized chlorinated olefin-based polymer.

In one embodiment, the composition is formed using an anhydride and/or carboxylic acid functionalized, chlorinated olefin-based polymer that has a chlorine content from 10 to 40 wt %, based on the total weight of the anhydride and/or carboxylic acid functionalized, chlorinated olefin-based polymer. All individual values and subranges from 10 to 40 wt % chlorine are included and disclosed herein; for example, the chlorine content can be from a lower limit of 10, or 12, or 14, or 16, or 18, wt % to an upper limit of 20, or 22, or 24, or 26, or 28, or 30, or 32, 35 or 40 wt %. For example, the chlorine content can be from 10 to 40 wt %, or in the alternative, from 10 to 20 wt %, or from 20 to 40 wt %, or from 18 to 32 wt %, or from 15 to 30 wt %. In a particular embodiment, the anhydride and/or carboxylic acid functionalized, chlorinated olefin-based polymer is a maleic anhydride grafted chlorinated polyolefin. In yet another specific embodiment, the anhydride and/or carboxylic acid functionalized, chlorinated olefin-based polymer is a maleic anhydride grafted chlorinated polyolefin having a maleic anhydride content of from 0.75 to 3 wt %, based on the weight of the anhydride functionalized, chlorinated olefin-based polymer. All individual values and subranges from 0.75 to 3 wt % are included and disclosed herein; for example, the maleic anhydride level can be from a lower limit of 0.75, 0.80, 0.85 wt % to an upper limit of 0.90, 0.95, 1.00, 1.15, 1.20, 1.25, 1.30, 1.35, 1.40, 1.50, 1.60, 1.70, 1.80, 1.90, 2.00, 2.10, 2.20, 2.30, 2.40, 2.50, 2.60, 2.70, 2.80, 2.90 or 3.00 wt %. For example, the maleic anhydride level can be from 0.75 to 3.00 wt %, or from 0.75 to 2.50 wt %, or from 1.00 to 3 wt %, or from 1.00 to 2.50 wt %. In another embodiment, the anhydride and/or carboxylic acid functionalized, chlorinated olefin-based polymer is a maleic anhydride grafted chlorinated polyolefin (or maleic anhydride grafted chlorinated olefin-based polymer) having a weight average molecular weight, Mw, from 25,000 to 125,000 g/mole. All individual values and subranges from 25,000 to 125,000 g/mole are included and disclosed herein; for example, the Mw can be from a lower limit of 25,000, or 30,000, or 35,000, or 40,000 g/mole to an upper limit of 60,000, or 75,000, or 100,000, or 125,000 g/mole. For example, the Mw can be from 25,000 to 125000 g/mole, or from 25,000 to 75,000 g/mole, or from 75,000 to 125,000 g/mole, or from 75,000 to 100,000 g/mole.

Exemplary component B polymers include maleic anhydride grafted chlorinated polyolefins (or maleic anhydride grafted chlorinated olefin-based polymer; for example a maleic anhydride grafted chlorinated ethylene-based polymer or a maleic anhydride grafted chlorinated propylene-based polymer).

Photoinitiator

In one embodiment, an inventive composition further at least one photoinitiator. Photoinitiators, a/k/a photopolymerization initiators, photoreaction initiators, and the like, are known in the art. Exemplary photoinitiators include benzoin methyl ether, benzoin ethyl ether, benzoin isobutyl ether, benzoin isopropyl ether, benzoin, .alpha.-methylbenzoin, benzoin n-butyl ether, 2-ethylanthraquinone, 2-tert-butylanthraquinone, 1-chloroanthra-quinone, 2-amylanthraquinone, 2-aminoanthraquinone, benzophenone, p-chlorobenzo-phenone, p-dimethylaminobenzophenone, benzophenone methyl ether, methylbenzophenone, 4,4-dichlorobenzophenone, 4,4-bisdiethylaminobenzophenone, diphenyl sulfide, tetramethyl-thiuram disulfide, 2,4-dimethylthioxanthone, 2,4-diisopropylthioxanthone, 2,4-diethylthioxanthone, 2-chlorothioxanthone, 2-isopropylthioxanthone, 2,2-dimethoxy-2-phenylaceto-phenone, .alpha.,.alpha.-dichloro-4-phenoxyacetone, p-tert-butyltrichloroacetophenone, p-tert-butyldichloroacetophenone, 2,2-diethoxyacetophenone, p-dimethylaminoacetophenone, hydroxycyclohexyl phenyl ketone, 1-(4-isopropylphenyl)-2-hydroxy-2-methylpropane-1-one, 2,2-dimethoxy-1,2-diphenylethane-1-one, 2,4,6-trimethylbenzoin diphenylphosphine oxide, 2-methyl-1-[4-(methylthio)phenyl]-2-morpholinopropane-1-one, 4-(2-acryloxy)oxyethoxy-phenyl 2-hydroxy-2-propyl ketone, 4-(2-hydroxy)phenyl-(2-hydroxy-2-propyl) ketone, bis-(2,6-dimethoxybenzoyl)-2,4,4-trimethylphenylphosphine
oxide, etc. Among these, benzophenone, 2-ethylanthraquinone, 2,4-dimethylthioxanthone, 2,4-diisopropylthioxanthone, 2,4-diethylthioxanthone, 2-chlorothioxanthone, 2-isopropylthioxanthone, hydroxyl-cyclohexyl phenyl ketone, 1-(4-isopropylphenyl)-2-hydroxy-2-methylpropane-1-one and 2,2-dimethoxy-1,2-diphenylethane-1-one are preferred because of good curability, adhesion and heat resistance. In the practice of the invention, one or two or more of them can be used singly or in combination in the under coating.

Solvent

In one embodiment, an inventive composition further comprises one or more non-aromatic and nonchlorinated organic solvents. Any non-aromatic and non-chlorinated solvent may be used in some embodiments of the inventive composition. Exemplary non-aromatic and non-chlorinated solvents include heptane, methyl cyclohexane (MCH), ethyl cyclohexane, cyclohexane, cyclohexanone, methyl ethyl ketone (MEK), ethyl acetate (EA), butyl acetate (BA), and any combination of two or more thereof. In a particular embodiment, the solvent is selected from the group consisting of MCH and heptane.

Definitions

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "olefin-based polymer," as used herein, refers to a polymer that comprises a majority amount of polymerized olefin monomer, for example ethylene or propylene (based on weight of the polymer) and, optionally, may contain at least one comonomer.

The term "ethylene-based polymer," as used herein, refers to a polymer that comprises 50 wt % or a majority amount of polymerized ethylene monomer (based on weight of the polymer) and, optionally, may contain at least one comonomer.

The term "ethylene/α-olefin interpolymer," as used herein, refers to an interpolymer that comprises 50 wt % or a majority amount of polymerized ethylene monomer (based on the weight of the interpolymer) and at least one α-olefin. The term, "ethylene/α-olefin copolymer," as used herein, refers to a copolymer that comprises 50 wt % or a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "propylene/α-olefin interpolymer," as used herein, refers to an interpolymer that comprises a majority amount of polymerized propylene monomer (based on the weight of the interpolymer) and at least one α-olefin. The α-olefin of a propylene/α-olefin interpolymer may be ethylene. The term, "propylene/α-olefin copolymer," as used herein, refers to a copolymer that comprises a majority amount of polymerized propylene monomer (based on the weight of the copolymer), and an α-olefin, as the only two monomer types. The α-olefin of a propylene/α-olefin copolymer may be ethylene.

The term "composition," as used herein, includes a mixture of materials which comprise the composition, as well as reaction products and decomposition products formed from the materials of the composition.

As used herein, the term "chlorinated olefin-based polymer," refers to an olefin-based polymer comprising units derived from one or more chlorine-containing comonomers, or an olefin-based polymer which was subjected to a chlorination reaction. Exemplary chlorination reactions are described in U.S. Pat. Nos. 7,763,692, 5,446,064, 4,767,823 and PCT Publication No. WO2008/002952, the disclosures of which are incorporated herein by reference.

The term "hydrocarbon," as used herein, refers to a chemical group containing only hydrogen and carbon atoms.

The term "hydrocarbylene," as used herein, refers to a divalent (diradical) chemical group containing only hydrogen and carbon atoms.

The term "substituted hydrocarbylene," as used herein, refers to a hydrocarbylene, in which at least one hydrogen atom is substituted with a substituent that comprises at least one heteroatom.

The term "hetero-hydrocarbylene," as used herein, refers to a hydrocarbylene, in which at least one carbon atom, or CH group, or CH2 group, is substituted with a heteroatom or a chemical group containing at least one heteroatom. Heteroatoms include, but are not limited to, O, N, P and S.

The term "substituted hetero-hydrocarbylene," as used herein, refers to a heterohydrocarbylene, in which at least one hydrogen atom is substituted with a substituent that comprises at least one heteroatom.

The term "hydrocarbyl," as used herein, refers to a monovalent (monoradical) chemical group containing only hydrogen and carbon atoms.

The term "substituted hydrocarbyl," as used herein, refers to a hydrocarbyl, in which at least one hydrogen atom is substituted with a substituent that comprises at least one heteroatom.

The term "hetero-hydrocarbyl," as used herein, refers to a hydrocarbyl, in which at least one carbon atom, or CH group, or CH2 group, is substituted with a heteroatom or a chemical group containing at least one heteroatom. Heteroatoms include, but are not limited to, O, N, P and S.

The term "substituted hetero-hydrocarbyl," as used herein, refers to a heterohydrocarbyl, in which at least one hydrogen atom is substituted with a substituent that comprises at least one heteroatom.

The term "aryl," as described herein, refers to an organic radical derived from aromatic hydrocarbon by deleting one hydrogen atom therefrom. An aryl group may be a monocyclic and/or fused ring system, each ring of which suitably contains from 4 to 7, preferably from 5 or 6 atoms. Structures wherein two or more aryl groups are combined through single bond(s) are also included. Specific examples include, but are not limited to, phenyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like, but are not restricted thereto. The naphthyl may be 1-naphthyl or 2-naphthyl, the anthryl may be 1-anthryl, 2-anthryl or 9-anthryl, and the fluorenyl may be any one of 1-fluorenyl, 2-fluorenyl, 3-fluorenyl, 4-fluorenyl and 9-fluorenyl.

The term "substituted aryl," as used herein, refers to an aryl, in which at least one hydrogen atom is substituted with a heteroatom or a chemical group containing at least one heteroatom. Heteroatoms include, but are not limited to, O, N, P and S.

The term "heteroaryl," as described herein, refers to an aryl group, in which at least one carbon atom or CH group or $CH_2$ is substituted with a heteroatom (for example, B, N, O, S, P(=O), Si and P) or a chemical group containing at least one heteroatom. The heteroaryl may be a 5- or 6-membered monocyclic heteroaryl or a polycyclic heteroaryl which is fused with one or more benzene ring(s), and may be partially saturated. Examples include, but are not limited to, monocyclic heteroaryl groups, such as furyl, thiophenyl, pyrrolyl, imidazolyl, pyrazolyl, thiazolyl, thiadi-azolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl; polycyclic heteroaryl groups, such as benzofuranyl, fluoreno[4,3-b]benzofuranyl, benzothiophenyl, fluoreno-[4,3-b]benzo-thiophenyl, isobenzofuranyl, benzimidazolyl, benzothiazolyl, benzisothi-azolyl, benzisoxazolyl, benzoxazolyl, isoindolyl, indolyl, indazolyl, benzothiadiazolyl, quinolyl, isoquinolyl, cinnolinyl, quinazolinyl, quinoxalinyl, carbazolyl, phenanthridinyl and benzodioxolyl; and corresponding N-oxides (for example, pyridyl N-oxide, quinolyl N-oxide) and quaternary salts thereof.

The term "substituted heteroaryl," as used herein, refers to a heteroaryl, in which at least one hydrogen atom is substituted with a heteroatom or a chemical group containing at least one heteroatom. Heteroatoms include, but are not limited to, O, N, P and S.

The term "alkyl," as described herein, refers to an organic radical derived from an aliphatic hydrocarbon by deleting one hydrogen atom therefrom. An alkyl group may be linear, branched and/or cyclic. Specific examples include, but are not limited to, methyl, ethyl, propyl, tert-butyl, tert-octyl, pentyl, hexyl, cyclopropyl, cyclobutyl, cyclopentyl, and cyclohexyl.

The term "substituted alkyl," as used herein, refers to an alkyl, in which at least one hydrogen atom is substituted with a heteroatom or a chemical group containing at least one heteroatom. Heteroatoms include, but are not limited to, O, N, P and S.

The term "heteroalkyl," as described herein, refers to an alkyl group, in which at least one carbon atom or CH group or $CH_2$ is substituted with a heteroatom (for example, B, N, O, S, P(=O), Si and P) or a chemical group containing at least one heteroatom.

The term "substituted heteroalkyl," as used herein, refers to a heteroaryl in which at least one hydrogen atom is substituted with a heteroatom or a chemical group containing at least one heteroatom. Heteroatoms include, but are not limited to, O, N, P and S.

The term "acrylate-containing oligomer," as used herein, refers to an oligomer that comprises one or more acrylate groups, for example, one or more acrylate or methacrylate groups; and the term "oligomer" refers to a polymeric compound that has a number average molecular weight (Mn)≤1500 g/mole.

Test Methods
GPC (for Oligomers)

The samples were dissolved in tetrahydrofuran:MEOH=9:1, by volume, over-night, and the concentration is 4 mg/mL, then GPC was measured by Agilent 1200 (PL Polystyrene Narrow standards (Part No.: 2010-0101) with molecular weights ranging from 19,760 to 580 g/mol; Column: One Mixed E columns (7.8×300 mm); Mobile Phase: Tetrahydrofuran; Detector: Agilent Refractive Index detector; Column Temperature of 35° C.). See Table B.

TABLE B

| Sample | Mn | Mw | MWD |
|---|---|---|---|
| DM 9166 | 166 | 209 | 1.25 |
| DM 272 | 200 | 209 | 1.04 |
| DM 278 | 223 | 328 | 1.47 |

Viscosity at 25° C.

The polymer sample (200 g) was stored in 250 ml glass beaker at room temperature (ambient atmosphere). Viscosities of the samples correspondingly by Brookfield Model DV-II+ Pro. All standard LV torque Brookfield Viscometers/Rheometers are supplied with a standard spindle set (LV-1 through LV-4) constructed of #302 stainless steel. According to "BROOKFIELD DV-II+ Pro PROGRAMMABLE VISCOMETER Operating Instructions Manual No. M/03-165-C0508W," the appropriate spindle number and speed (3-60 rpm) will result in measurements made between 10-100 on the instrument % torque scale. For, example, some suitable spindles are as follows: LV-1(61) for 15-20K mPa·s; LV-2 (62) for 50-100K mPa·s; LV-3(63) for 200-400K mPa·s; LV-4(64) for 1-2M mPa·s.

Acid Value

Acid value is the quantity of a specified base, expressed in milligrams of potassium hydroxide per gram of sample and was measured using titration method at room temperature according to ASTM D974. Acid value: DM272 (200 mg KOH/g sample), DM278 (70-80 mg KOH/g sample), DM-9166 (235-305 mg KOH/g sample).

Melt Index

Melt index (I2, or MI) of an ethylene-based polymer is measured in accordance with ASTM D-1238 at a temperature of 190° C. and a load of 2.16 Kg.

Gel Permeation Chromatography (for Terpolymer and Styrenic Interpolymer)

The molecular weight information of the Kraton interpolymers were determined by size-exclusion chromatograph (SEC). The SEC system was based on a Waters Alliance 2695, operated at 1 mL/minute. The eluent was HPLC grade tetrahydrofuran (THF), which was continuously degassed with the online vacuum degasser within the Alliance 2695. The Waters Alliance 2695 was programmed to inject 50 microliters of sample solutions. The sample solution was prepared at a concentration of 2.0 mg/mL in THF. SEC separations were performed on a series of two, "7.5 mm (internal diameter)×300 mm (length)" PLgel Mixed-C columns from Agilent Technologies. The differential refractive index detector, within a Viscotek Model 302 triple detector array, was used for detection. Columns and detectors were operated at 35° C. SEC chromatograms were collected and reduced via OmniSEC software version 4.0 from Viscotek. Seventeen narrow PS molecular weight standards (Agilent Technologies), covering the molecular weight range from 3,742 kg/mol to 0.58 kg/mol were used for column calibration. The standards were prepared as cocktails at concentrations of 0.5 mg/mL each in THF. The calibration curve was the least squares fit to a third order polynomial. Molecular weight distributions were calculated from the DRI detector chromatogram and the PS calibration curve under the assumption of constant refractive index increment across the SEC chromatogram. All references to molecular weight are not absolute, but linear PS equivalent values.

Density

Density is measured in accordance with ASTM D-792. The density measured is a "quick density," meaning that the density is determined after one hour from the time of molding. Test samples are compression molded at a temperature of 20° C. higher than the melting point of polymer, and at a pressure of 10 MPa for five minutes (dimensions of molded sample: 50 cm$^2$×1-2 mm).

EXAMPLES

Primer formulations components are shown in Tables 1-5 below. Primer formulations are shown in Tables 6A-6F, where the weight percent of each component is listed.

TABLE 1

| Component B | |
|---|---|
| Material Name | Structure or Description |
| HARDLEN F-2P (F-2P) | Maleic anhydride grafted chlorinated polyolefin (MAH-g-CPO) commercially available from Toyobo with chlorine level of 19-21% |
| SUPERCHLORN 930S (930S) | Maleic anhydride grafted chlorinated polyolefin (MAH-g-CPO) commercially available from Nippon Paper with chlorine level of 20-22% |

TABLE 2

| Component C | |
|---|---|
| Material Name | Structure or Description |
| KRATON G1652 (SEBS 1652) | Styrene ethylene butene styrene block copolymer commercially available from Kraton with styrene level of 30 wt % |
| KRATON FG1901 | Styrene ethylene butene styrene block copolymer commercially available from Kraton with styrene level of 30 wt % and MAH level of 1.7 wt % |

TABLE 3

| Component D | |
|---|---|
| Material Name | Structure |
| DOUBLEMER HDDA (HDDA) | 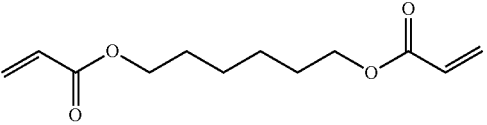 [SMILES: C=CC(=O)OCCCCCCOC(=O)C=C] |
| DOUBLEMER TPGDA (TPGDA) | 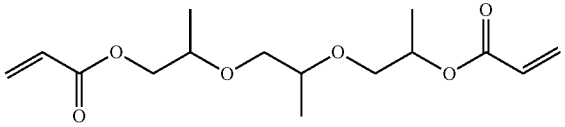 [SMILES: C=CC(=O)OCC(C)OCC(C)OCC(C)OC(=O)C=C] |

TABLE 4

| Solvents | |
|---|---|
| Solvents | Supplier |
| Methyl ethyl ketone (MEK) | Sino-reagent Company, chemical pure, BP 79.6° C. |
| Methyl cyclohexane (MCH) | Wokai Reagent Company, chemical pure, BP 100° C. |

The photoinitiator was DOUBLECURE 184, supplied by Double Bond Chemical Ind.), which was directly dissolved in methyl-ethyl-ketone (MEK) at room temperature.

TABLE 5

| (Component A: Modifiers) | | | |
|---|---|---|---|
| Chemical Name | Structure | Chemical Name | Structure |
| Acrylic acid, CAS # 79-10-7 Molar mass: 72.06 MP: 13° C.; BP: 139° C. Density: 1.05 g/ml | 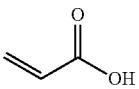 | N-hydroxymethyl-acrylamide CAS: 924-42-5 Molar mass: 101.11 g/mol MP: 75° C.; BP: 318° C. Density: 1.082 g/ml | 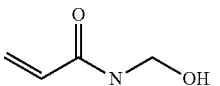 |

TABLE 5-continued (Component A: Modifiers)

| Chemical Name | Structure | Chemical Name | Structure |
|---|---|---|---|
| Methacrylic Acid (79-41-4)<br>Molar mass: 86.09 g/mol<br>Melting point: 16° C.<br>Boiling point: 161° C.<br>Density: 1.015 g/ml | (structure) | Maleic anhydride<br>CAS: 108-31-6<br>Molar mass: 98.06 g/mol<br>MP: 54° C.; BP: 202° C.<br>Density: 1.48 g/ml | (structure) |
| (Hydroxyethyl) methacrylate (868-77-9)<br>Molar mass 130.14 g/mol<br>MP: −12° C.; BP 213° C.<br>Density 1.07 g/ml | (structure) | (2-Acetoacetoxy)ethyl methacrylate<br>CAS: 21282-97-3<br>Molar mass: 214.22<br>Density: 1.12 g/ml | (structure) |
| Hydroxypropyl methacrylate<br>CAS: 27813-02-1<br>Molar mass: 144.17 g/mol<br>MP: 70° C.; BP: 205-209° C.<br>Density: 1.066 g/mL | (structure) | 3-Methacryloxy-propyltrimethoxysilane<br>CAS: 2530-85-0<br>Molar mass: 248.35<br>MP: −48° C.; BP: 190° C.<br>Density: 1.045 g/ml | (structure) |
| Itaconic acid,<br>CAS #: 97-65-4<br>Molar mass: 130.10 g/mol<br>MP: 167° C.; BP: 268° C.<br>Density: approx. 1.6 g/ml | (structure) | DOUBLEMER 272 (DM-272): | Carboxylated polyester acrylate (clear liquid) with 200 Acid value (mg KOH/g) and viscosity at 25° C., 10,000-30,000 mPa•s, commercially available from Double Bond Chemical (Taiwan) Co., LTD |
| Fumaric acid, CAS Number: 110-17-8; Molar mass: 116.07 g/mol; MP: 289° C. (decomp.); Density: 1.6 g/ml | (structure) | DOUBLEMER 278 (DM-278): | Chlorinated polyester acrylate (light yellowish liquid) with 70-90 Acid value (mg KOH/g) and viscosity at 25° C., around 80000 mPa•s, commercially available from Double Bond Chemical (Taiwan) Co., LTD |
| Glycidyl methacrylate (GMA)<br>CAS: 106-91-2<br>Molar mass: 142.15 g/mol<br>MP: −82° C.; BP: 189° C.<br>Density: 1.078 g/ml | (structure) | DOUBLEMER 9166 (DM-9166): | Acid modified methacrylate (dark liquid) with 230-300 Acid value (mg KOH/g) and viscosity at 25° C., 1800-3600 mPa•s, commercially available from Double Bond Chemical (Taiwan) Co., LTD |
| Phosphoethyl methacrylate (PEM)<br>CAS: 12737-61-0<br>Molecular Weight 210.12<br>Density 1.31 g/mL | (structure) | VINISOL WPOH from Braskem<br>Molecular weight: 86 000 | (structure)<br>Co-monomer ratio: 81/11/8 |
| Methacrylamide<br>CAS 79-39-0<br>Molar mass: 85.11 g/mol<br>MP: 110° C.; BP: 215° C.<br>Density: 1.115 g/ml | (structure) | | |

TABLE 6A

Primers-different DM-278 levels (with solvents, 2.5 wt % solids, based on wt of primer)

| Component | CE-1 | IE-1' | IE-1 | IE-2 | IE-3 | IE-4 | IE-2' |
|---|---|---|---|---|---|---|---|
| DM278 (A) | 0 | 0.12 | 0.23 | 0.41 | 0.7 | 0.91 | 1.07 |
| F-2P (B) | 1.21 | 1.15 | 1.09 | 1 | 0.85 | 0.73 | 0.65 |
| SEBS 1652 (C) | 0.42 | 0.4 | 0.38 | 0.34 | 0.29 | 0.25 | 0.22 |
| HDDA (D) | 0.4 | 0.38 | 0.36 | 0.33 | 0.28 | 0.25 | 0.22 |
| TPGDA (D) | 0.4 | 0.38 | 0.36 | 0.33 | 0.28 | 0.25 | 0.22 |
| 184 | 0.07 | 0.07 | 0.08 | 0.09 | 0.1 | 0.11 | 0.12 |
| MCH | 78 | 78 | 78 | 78 | 78 | 78 | 78 |
| MEK | 19.5 | 19.5 | 19.5 | 19.5 | 19.5 | 19.5 | 19.5 |
| Whole Weight | 100 | 100 | 100 | 100 | 100 | 100 | 100 |

TABLE 6B

Primer-different VINISOL levels (with solvents, 2.5 wt % solids, based on wt of primer)

| Component | CE-4 | IE-3' | IE-5 | IE-6 | IE-7 | IE-8 | IE-4' |
|---|---|---|---|---|---|---|---|
| VINISOL WPOH (A) | 0 | 0.12 | 0.23 | 0.42 | 0.71 | 0.94 | 1.12 |
| F-2P (B) | 1.21 | 1.14 | 1.09 | 1 | 0.86 | 0.76 | 0.67 |
| SEBS 1652 (C) | 0.42 | 0.4 | 0.38 | 0.35 | 0.3 | 0.26 | 0.23 |
| HDDA (D) | 0.4 | 0.39 | 0.37 | 0.34 | 0.29 | 0.25 | 0.22 |
| TPGDA (D) | 0.4 | 0.39 | 0.37 | 0.34 | 0.29 | 0.25 | 0.22 |
| 184 | 0.07 | 0.06 | 0.06 | 0.05 | 0.05 | 0.04 | 0.04 |
| MCH | 48.75 | 48.75 | 48.75 | 48.75 | 48.75 | 48.75 | 48.75 |
| MEK | 48.75 | 48.75 | 48.75 | 48.75 | 48.75 | 48.75 | 48.75 |
| Whole weight | 100 | 100 | 100 | 100 | 100 | 100 | 100 |

TABLE 6C

Primers-different component A (with solvents, 2.5 wt % solids, based on wt of primer)

| Component | IE-9 | IE-10 | IE-11 | IE-12 |
|---|---|---|---|---|
| HEMA (A) | 0.41 | | | |
| MAA (A) | | 0.41 | | |
| DM 272 (A) | | | 0.41 | |
| DM 9166 (A) | | | | 0.41 |
| F2P (B) | 1 | 1 | 1 | 1 |
| SEBS 1652 (C) | 0.34 | 0.34 | 0.34 | 0.34 |
| HDDA (D) | 0.33 | 0.33 | 0.33 | 0.33 |
| TPGDA (D) | 0.33 | 0.33 | 0.33 | 0.33 |
| 184 | 0.09 | 0.09 | 0.09 | 0.09 |
| MCH | 78 | 78 | 78 | 78 |
| MEK | 19.5 | 19.5 | 19.5 | 19.5 |
| Whole weight | 100.00 | 100.00 | 100.00 | 100.00 |

TABLE 6D

Primer Formulations-different DM-278 levels (without solvents, 2.5 wt % solids)

| Component | CE-1 | IE-1' | IE-1 | IE-2 | IE-3 | IE-4 | IE-2' |
|---|---|---|---|---|---|---|---|
| DM278 (A) | 0 | 4.8 | 9.2 | 16.4 | 28 | 36.4 | 42.8 |
| F-2P (B) | 48.4 | 46 | 43.6 | 40 | 34 | 29.2 | 26 |
| SEBS 1652 (C) | 16.8 | 16 | 15.2 | 13.6 | 11.6 | 10 | 8.8 |
| HDDA (D) | 16 | 15.2 | 14.4 | 13.2 | 11.2 | 10 | 8.8 |
| TPGDA (D) | 16 | 15.2 | 14.4 | 13.2 | 11.2 | 10 | 8.8 |
| 184 | 2.8 | 2.8 | 3.2 | 3.6 | 4 | 4.4 | 4.8 |
| Solid Sum | 100 | 100 | 100 | 100 | 100 | 100 | 100 |
| A/(B + C + D) | 0 | 0.05 | 0.11 | 0.21 | 0.41 | 0.61 | 0.82 |

TABLE 6E

Primer Formulations-different VINISOL levels (without solvents, 2.5 wt % solid)

| Component | CE-4 | IE-3' | IE-5 | IE-6 | IE-7 | IE-8 | IE-4' |
|---|---|---|---|---|---|---|---|
| VINISOL WPOH (A) | 0 | 4.8 | 9.2 | 16.8 | 28.4 | 37.6 | 44.8 |
| F-2P (B) | 48.4 | 45.6 | 43.6 | 40 | 34.4 | 30.4 | 26.8 |
| SEBS 1652 (C) | 16.8 | 16 | 15.2 | 14 | 12 | 10.4 | 9.2 |
| HDDA (D) | 16 | 15.6 | 14.8 | 13.6 | 11.6 | 10 | 8.8 |
| TPGDA (D) | 16 | 15.6 | 14.8 | 13.6 | 11.6 | 10 | 8.8 |
| 184 | 2.8 | 2.4 | 2.4 | 2 | 2 | 1.6 | 1.6 |
| Solid Sum | 100 | 100 | 100 | 100 | 100 | 100 | 100 |
| A/(B + C + D) | 0 | 0.05 | 0.10 | 0.21 | 0.41 | 0.62 | 0.84 |

TABLE 6F

Primer Formulations - different component A (without solvents, 2.5 wt % solids)

| Component | IE-9 | IE-10 | IE-11 | IE-12 |
|---|---|---|---|---|
| HEMA (A) | 16.4 | | | |
| MAA (A) | | 16.4 | | |
| DM 272 (A) | | | 16.4 | |
| DM 9166 (A) | | | | 16.4 |
| F2P (B) | 40 | 40 | 40 | 40 |
| SEBS 1652 (C) | 13.6 | 13.6 | 13.6 | 13.6 |
| HDDA (D) | 13.2 | 13.2 | 13.2 | 13.2 |
| TPGDA (D) | 13.2 | 13.2 | 13.2 | 13.2 |
| 184 | 3.6 | 3.6 | 3.6 | 3.6 |
| Solid Sum | 100 | 100 | 100 | 100 |
| A/(B + C + D) | 0.21 | 0.21 | 0.21 | 0.21 |

Representative Process to Form a Primer Formulation (UV Primer)

Here, IE-1 sample is taken to show a representative process. To make this primer formulation, several pre-solutions were first prepared, as shown by the following:

Solution a: A 10 wt %, based on weight of final solution, of DM-278 dissolved in a solvent mixture of MEK/MCH (1:1 by weight).

Solution b: A 5 wt %, based on weight of final solution, of F-2P dissolved in methyl cyclohexane (MCH), by heating and refluxing the solution, in a three neck flask at 80° C., for 30 minutes, with mechanical stirring.

Solution c: A 10 wt %, based on weight of final solution, of SEBS 1652 dissolved in MCH, by heating and refluxing the solution, in a three neck flask, at 80° C., for 30 minutes with mechanical stirring.

Solution d: A 10 wt %, based on weight of final solution, of photoinitiator 184 directly dissolved in methyl-ethyl-ketone (MEK), at room temperature.

Solution e: A 10 wt %, based on weight of final solution, of HDDA dissolved in a solvent mixture of MEK/MCH (1:1 by weight).

Solution f: A 10 wt %, based on weight of final solution, TPGDA dissolved in a solvent mixture of MEK/MCH (1:1 by weight).

To make the IE-1 sample, the following solutions were mixed together: Solution a (2.3 g), Solution b (21.8 g), Solution c (3.8 g), Solution d (0.8 g), Solution e (3.6 g), Solution f (3.6 g), with an additional 49.6 g of MCH and 14.5 g of MEK, to get "100 g of UV primer IE1 with 2.5 wt % solid content."

For the other primer formulations, the respective solutions prepared in above, were mixed in a certain ratios, in order to achieve the formulations listed in Tables 6A-6F above.

Preparation of the Foam Substrate

The formulation for the foamed substrate are listed below, and the foam formulation is shown in Table 7.

INFUSE 9530: olefin block copolymer, density 0.885 g/cm$^3$ (ASTM D792), MI 5 g/10 min (ASTM D1238, at 190° C./2.16 kg), Shore A=83 (ASTM D2240) (commercially available from The Dow Chemical Company).

LUPEROX DC40P: Dicumyl peroxide from Arkema, with an active peroxide content around 40 wt % (commercially available from Arkema Inc.). LUPEROX DC40P-SP2: Dicumyl peroxide (scorch protection) from Arkema, with an active peroxide content around 40 wt % (commercially available from Arkema Inc.).

AC9000: Azodicabonamide type blowing (available from Kum Yang (Korea) company).

ZnO: Zinc oxide; and ZnSt: Zinc stearate. ATOMITE: Calcium carbonate (available from Imerys Pigments (Roswell, Ga., USA)).

TABLE 7

| Foam Formulation | |
|---|---|
| | weight parts |
| INFUSE 9530 | 100 |
| LUPEROX DC40P | 1.5 |
| LUPEROX DC40P-SP2 | 1 |
| AC9000 | 2 |
| ZnO | 0.2 |
| ZnSt | 0.2 |
| CaCO$_3$ | 5 |

OBC Foam Preparation—Compounding

Polymer pellets (INFUSE 9530) were added to a 1.5 liter, Banbury mixer. Then, ZnO, ZnSt and CaCO$_3$ were added, after the polymer had melted (around 5 minutes). The blowing agent and peroxide were added last, after the ZnO, ZnSt and CaCO$_3$ were uniformly dispersed, and the contents mixed for another 3 to 5 minutes, for a total mixing time of 15 minutes. The batch temperature was checked by using a thermo probe detector, right after the compounds were discharged. The actual temperature of the composition was generally from 10 to 15° C. higher than the displayed temperature on the equipment (composition temperature was around 120° C.). Hence, during the compounding process, a lower displayed equipment temperature was maintained to ensure the compound temperature did not exceed the decomposition temperature of the curing agent and the decomposition temperature blowing agent. The compounded formulation was placed between two roll mills (maintained at a temperature of about 120° C.), and the compounded formulation was formed into a sheet (or roll milled blanket) of about 5 mm in thickness.

Bun Foam Preparation

The roll milled blankets were cut into squares (three or four "6 inch×6 inch"), and placed inside a pre-heated, bun foam mold of dimensions around 49 square inches. The surface of the chase was sprayed with mold releasing agent, to avoid sticking of the foam to the chase during de-molding. Two compression molding processes were involved: first a preheating process to eliminate air pockets inside the sample and between the stacked blanket layers prior to curing, and then a curing/foaming process. The preheating was conducted for 8 minutes at 120° C., and pressed at 10 tons, for 4 minutes, to form a solid mass in the mold before foaming. The preheated mass was transferred to the foaming press, and held for 8 minutes at 100 kg/cm$^2$ and 180° C. Once the pressure was released, the bun foam was removed quickly from the tray, and placed in a vent hood on several non-stick sheets, and the top side length was measured as soon as possible. The foam surface was from the bench top, using cardboard boxes, to prevent uneven cooling on the top and bottom surfaces. The foam was cool in the hood for 40 minutes, and then transferred to a storage container, and allowed to cool for 24 hours. The final bun foam was sliced into 12.5 cm (length)*2 cm (width)*0.5 cm (thickness) specimen for the later bonding test.

PU (Polyurethane) adhesives include products which are commercially available: under the names 6602, 6608, and GE-01, all from Great Eastern Resins Industrial Co. Ltd. (Taiwan); under the names NP-98, NP-200 and NP-580, all from Nan Pao Resins Chemical Co. Ltd. (Taiwan); and under the names WU-602L and WU-606, all from lao Son Hong Tinta E Vernizes Lda./Zhong Bu (Centresin) Adhesive & Chemical Co., Ltd. (Macau). For the lamination below, the NP 200 was used.

The cotton fabric strip was a super heavy-duty 1 inch-wide webbing, which contained 85 wt % cotton and 15 wt % FORTISAN. It was made by Southern Weaving Company, and purchased from Armysurpluswarehouse.com. The fabric strips were washed with ALCONOX TERGAJET powder detergent, in a dishwashing machine on a "Sanitize" washing cycle. The webbing was then removed and air dried (thickness of fabric was 2 mm).

Adhesive Study—Lamination and Peel Strength Measurement:

FIG. 1 depicts a schematic of the cross-section of the lamination layers 1. The surface area was 10 cm×2 cm, for both the foam and the cotton fabric. The thickness of the UV primer layer (after drying) was around 5 µm, while the thickness of PU adhesive layer in the final laminates was around 50 m. The UV primer dry coating weight on the OBC foam surface was 4 to 8 g/m². The PU adhesive coating weight on OBC foam surface was 10 to 20 g/m². The PU adhesive coating weight on the cotton fabric was 100 to 150 g/m² because of the rough surface of the cotton fabric.

The corresponding procedure listed below, used a waterborne based PU (NP 200). Step 1: The OBC foam skin surface was cleaned with MEK. Step 2: the cleaned OBC foam was placed into an oven, equilibrated at 60° C., for 3 minutes. Step 3: The UV primer was applied onto the cleaned OBC foam skin surface. Step 4: The primer treated OBC foam was placed into the "60° C. oven" for 3 minutes. Step 5: The primer treated OBC foam was irradiated under UVA light, at 60 mW/cm² for 60 seconds, to cure the UV primer. Step 6: The water borne based PU adhesive was applied to both the OBC (with UV cured primer) and the cotton fabric surface. Step 7: The "PU adhesive coated OBC foam" and the "PU adhesive coated cotton fabric" were placed into the "60° C. oven" for 4 minutes. Step 8: The OBC foam and cotton fabric, obtained in Step 7 were compressed together (PU adhesive layer to PU adhesive layer) at a pressure of 3 to 5 kgf/cm². See FIG. 1. Step 9: The laminated obtained in Step 8 was stored (5 minutes or 24 hours) at room temperature, ambient atmosphere, for the future peel strength test.

Figure 2:
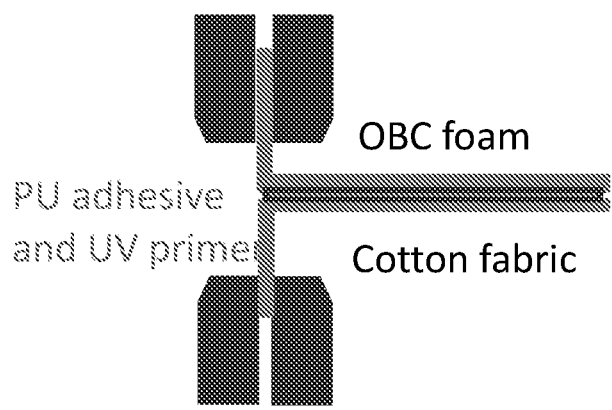
FIG. 2 is a schematic diagram of the test sample configuration during the T Peel test.

Each laminate (cotton fabric/PU/UV Primer/foam) was first cut into "12.5 cm (length)×2 cm (width)×1 cm (thickness)" test strips for the peel strength testing. Each strip had a bond area of "10 cm×2 cm" positioned such that the bond coincided with one end of the test strip, and ran the length of 10 cm, leaving a 2.5 cm section of the test strip that was not bonded. The peel (bond) strength (N/mm) was measured according to ASTM D1876, using a T peel test with a crosshead speed of 100 mm/min (rather than 254 mm/min as indicated in D1876). At the unbonded end of the test strip, the foam layer was clamped in the upper clamp, and the cotton fabric was clamped in the lower clamp (see FIG. 2). For each UV primer formulation, at least two test strips were analyzed. For each test strip, the peel (bond) strength was recorded at every 10 mm interval along the peel direction, and the average bond strength was calculated. As discussed above, for each primer formulation, at least two test strips were tested, and the average of these two measurements was reported in the Tables 8-10 below. The average peel strength at the "5 minute" storage and the "24 hour storage" are listed in the tables below.

TABLE 8

Adhesion Properties

| | Control | Different DM-278 levels | | | | |
|---|---|---|---|---|---|---|
| | CE-1 | IE-1' | IE-1 | IE-2 | IE-3 | IE-4 | IE-2' |
| A/(B + C + D) weight ratio | 0 | 0.05 | 0.11 | 0.21 | 0.41 | 0.61 | 0.82 |
| Peel Strength (5 min) N/mm | 1.3 | 1.6 | 2.5 | 2.7 | 2.0 | 2.0 | 1.5 |
| Peel Strength (24 hr) N/mm | 3.1 | 3.4 | 4.5 | 4.5 | 4.2 | 4.0 | 3.6 |

TABLE 9

Adhesion Properties

| | Control | Different VINISOL WPOH levels | | | | |
|---|---|---|---|---|---|---|
| | CE-4 | IE-3' | IE-5 | IE-6 | IE-7 | IE-8 | IE-4' |
| A/(B + C + D) weight ratio | 0 | 0.05 | 0.10 | 0.21 | 0.41 | 0.62 | 0.84 |
| Peel Strength (5 min), N/mm | 1.4 | 1.8 | 2.0 | 2.0 | 2.2 | 2.2 | 1.7 |
| Peel Strength (24 hr), N/mm | 3.2 | 3.6 | 4.6 | 4.6 | 4.6 | 4.5 | 3.3 |

TABLE 10

Adhesion Properties

| | IE-9 | IE-10 | IE-11 | IE-12 |
|---|---|---|---|---|
| Modifier (A) | HEMA | MAA | DM-272 | DM-9166 |
| A/(B + C + D) weight ratio | 0.21 | 0.21 | 0.21 | 0.21 |
| Peel Strength (5 min), N/mm | 2.3 | 2.5 | 2.6 | 2.5 |
| Peel Strength (24 hr), N/mm | 3.4 | 3.5 | 3.7 | 3.6 |

Summary of Results

As see in the tables above, CE-1 and CE-4 provide a good bonding strength >3 N/mm, when measured after 24 hr storage; however, the green peel strength measured within 5 minute storage is not very good. In other words, it takes time to build up the bonding strength for these primer formulations. Those primer formulations containing the DM-278 (IE-1', IE-2' and IE-1 to IE-4) or the VINISOL WPOH (IE-3', IE-4' and IE-5 to IE-8), had significantly improved "5 minute peel strength," and the final "24 hour peel strength" was better than the respective comparable samples, CE-1 or CE-4.

IE-1' and IE-3' were primers with lower level (5 wt %—see Tables 8 and 9)) of DM-278 or VINISOL WPOH, respectively. For these two samples, the "5 minute peel strength," and the final "24 hour peel strength" were not as high as the respective "IE-1 to IE-4," or "IE-5 to IE-8" samples, indication a more preferred primer formulation that contains a higher amount of the modifier (Component A), as compared to the "5 wt %" of IE-1' and IE-3'. IE-2' and IE-4' were primers with higher level (>80 wt %—see Tables 8 and 9)) of DM-278 or VINISOL WPOH, respectively. For these two samples, the "5 minute peel strength," and the final "24 hour peel strength" were not as high as the respective "IE-1 to IE-4," or "IE-5 to IE-8" samples, indication a more preferred primer formulation that contains a lower amount of the modifier (Component A), as compared to the ">80 wt %" of IE-2' and IE-4'.

What is claimed is:
1. A composition comprising at least the following:
   A) at least one modifier selected from a) through d) below:
      a) $R^1R^2C=CR^3$—(CO)—Z (Formula A),
      wherein $R^1$, $R^2$ and $R^3$ are each, independently, selected from the following: H; alkyl; heteroalkyl; aryl; heteroaryl; —C(O)—OH; or —R—C(O)—OH, where R is alkylene;
      Z is selected from the following: —OH; —O—R—OH, where R is alkylene; —NR'R", where R' and R" are each independently H or alkyl; —N(H)—R'''OH, where R''' is alkylene; silane;

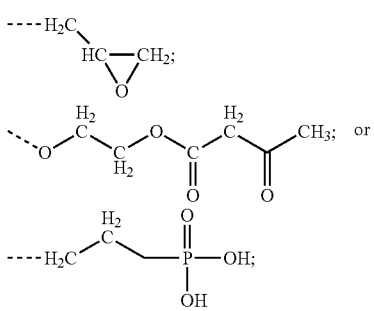

and wherein two or more atoms of Formula A may optionally form a ring structure;
b) an acrylate-containing oligomer that has an Mn≤1500 g/mol, and an acid value from 50 to 500 mg KOH/g;
c) a random terpolymer comprising, in polymerized form, vinyl chloride, vinyl acetate, and at least one of the following: a hydroxyl-containing alkyl acrylate, a hydroxyl-containing alkyl methacrylate, or a combination thereof;
d) or any combination of a) through c);
B) at least one chlorinated olefin-based polymer and/or at least one functionalized chlorinated olefin-based polymer;
C) at least one styrene-based block interpolymer or derivative thereof; and
D) at least one compound selected from the group consisting of the following:

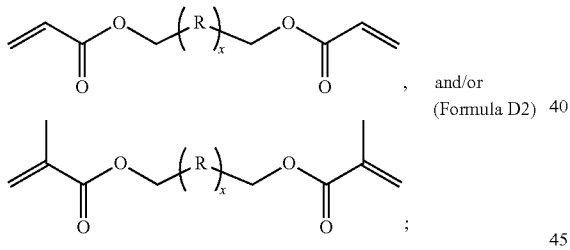

(Formula D1)

and/or (Formula D2)

wherein, for Formula D1, R is independently selected from the group consisting of the following; substituted or unsubstituted hydrocarbylenes, and substituted or unsubstituted hetero-hydrocarbylenes, and x is an integer ≥1;
wherein, for Formula D2, R is independently selected from the group consisting of the following; substituted or unsubstituted hydrocarbylenes, and substituted or unsubstituted hetero-hydrocarbylenes, and x≥1.

2. The composition of claim 1, wherein the composition further comprises at least one photoinitiator.

3. The composition of claim 1, wherein the weight ratio of component A to the sum weight of components B, C and D, A/(B+C+D), is from 0.10 to 0.75.

4. The composition of claim 1, wherein the component A is present in an amount from 5 to 35 wt %, based on the weight of the composition.

5. The composition of claim 1, wherein the component A is a random terpolymer (subcomponent c) that comprises the following properties: i) Mw from 10,000 to 100,000 g/mole;
ii) from 70 to 95 wt % vinyl chloride, based on the weight of the terpolymer, iii) from 5 to 15 wt % vinyl acetate, based on the weight of the terpolymer; and iv) from greater than zero to 15 wt %, based on the weight of the terpolymer, of a hydroxyl-containing alkyl acrylate, where alkyl group comprises 1 to 6 carbons, or a hydroxyl-containing alkyl methacrylate where the alkyl group comprises 1 to 6 carbons.

6. The composition of claim 1, wherein component D is selected from the following: (a) through (l):

(a)

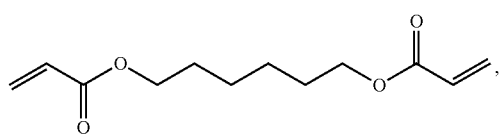

(b)

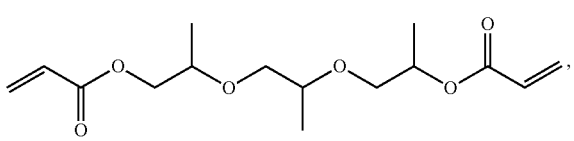

(c)

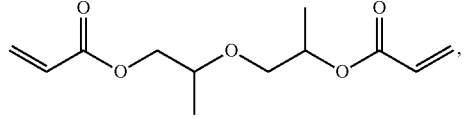

(d)

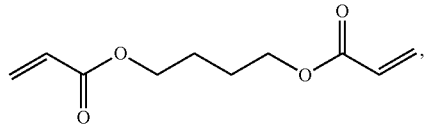

(e)

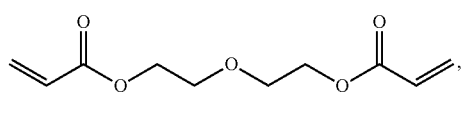

(f)

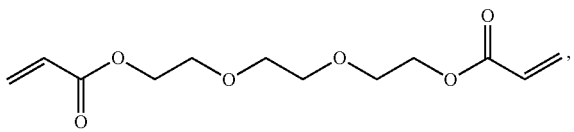

(g)

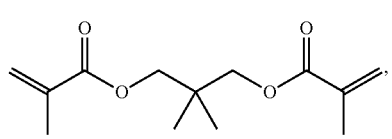

(h)

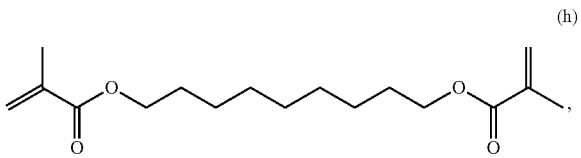

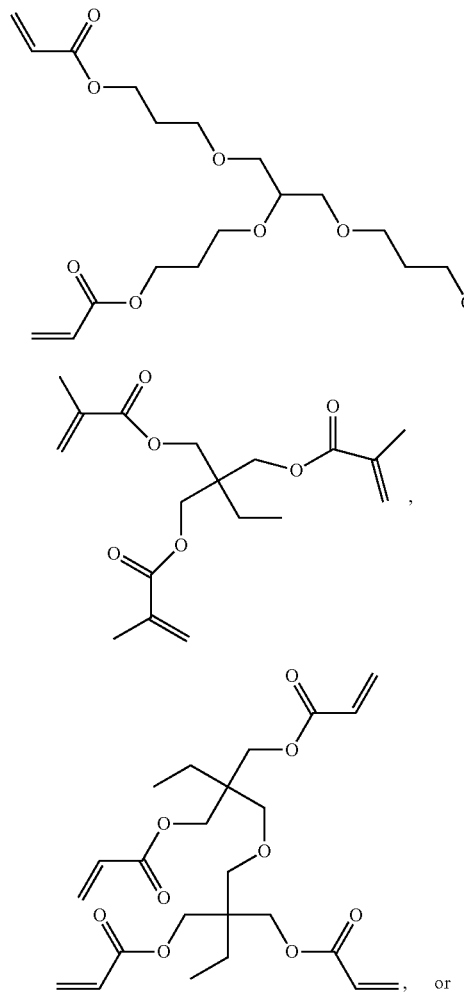

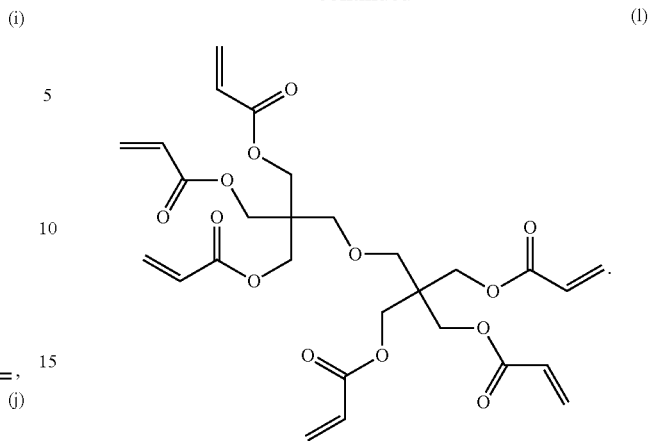

7. The composition according to claim 1, wherein component D) is selected from the group consisting of the following: 1,6 Hexanediol diacrylate (HDDA), tri propylene glycol di-acrylate (TPGDA); dipropylene glycol diacrylate (DPGDA); 1,4-butandiol diacrylate (BDDA); Diethylene glycol diacrylate; Triethylene glycol diacrylate; Neopentyl glycol diacrylate (NPGDA); and Nonanediol Diacrylate (NDDA).

8. The composition according to claim 1, wherein component B is a chlorinated olefin-based polymer having a chlorine content from 10 to 40 wt %, based on the weight of the chlorinated olefin-based polymer.

9. The composition according to claim 1, wherein component C) is selected from the group consisting of the following: styrene-ethylene/butylene-styrene block copolymer (SEBS); styrene/butadiene/styrene block copolymer (SBS); and maleic anhydride grafted styrene-ethylene/butylene-styrene block copolymer (SEBS-g-MAH).

10. An article comprising at least one component formed from the composition of claim 1.

* * * * *